United States Patent [19]

Tatsuguchi

[11] 3,772,468

[45] Nov. 13, 1973

[54] CAPSTAN PHASE MATCHING SYSTEM IN AN ELECTRONIC EDITING MODE FOR MAGNETIC RECORDING AND REPRODUCING APPARATUS

[75] Inventor: Kazuo Tatsuguchi, Yokohama, Japan

[73] Assignee: Victor Company of Japan, Ltd., Yokohama, Japan

[22] Filed: Feb. 1, 1972

[21] Appl. No.: 222,514

[30] Foreign Application Priority Data

Feb. 2, 1971 Japan .................................. 46/3896

[52] U.S. Cl. .. 179/100.2 B, 178/6.6 P, 179/100.2 S

[51] Int. Cl. ........................ G11b 27/32, G11b 15/52

[58] Field of Search ............... 179/100.2 B, 100.2 S; 178/6.6 P

[56] References Cited

UNITED STATES PATENTS

| | | | |
|---|---|---|---|
| 3,600,508 | 8/1971 | Dann et al. | 179/100.2 B |
| 3,654,398 | 4/1972 | Louth | 179/100.2 B |
| 3,636,252 | 1/1972 | Kowal | 179/100.2 B |

*Primary Examiner*—Terrell W. Fears
*Assistant Examiner*—Robert S. Tupper
*Attorney*—Louis Bernat

[57] ABSTRACT

A capstan phase matching system for use in an electronic editing mode is applicable to a magnetic recording and reproducing apparatus having a capstan servo system. The rotation of the capstan is controlled responsive to a comparison of the phase of a control signal reproduced from a magnetic tape with the phase of a reference signal, during a reproduction mode. A similar comparison of the phase of a rotation signal detected responsive to the rotation of the capstan with the phase of the reference signal, controls rotation of the capstan during the electronic editing mode. The phases of the rotation of the capstan and the reference signal are matched by means an error output of the phase comparison. This capstan phase matching system comprises means for detecting the rotation signal at a sufficiently greater frequency than the frequency of the reference signal in response to the rotation of said capstan. The frequency of the detected rotation signal is divided to provide a frequency which is coincidental with that of the reference signal. The frequency dividing means is brought into an operative state, from an inoperative state, when a first reference signal appears after switching from the reproducing mode to the electronic editing mode.

8 Claims, 5 Drawing Figures

CAPSTAN PHASE MATCHING SYSTEM IN AN ELECTRONIC EDITING MODE FOR MAGNETIC RECORDING AND REPRODUCING APPARATUS

BACKGROUND OF THE INVENTION

This invention relates to a capstan phase matching system, in an electronic editing mode, for use in a magnetic recording and reproducing apparatus. More particularly, it relates to a system for matching the phase of the rotation of a capstan, which drives a magnetic tape, with the phase of a reference signal, when the operation of a magnetic recording and reproducing apparatus is transferred from a reproducing mode to an electronic editing mode.

In an ordinary magnetic recording and reproducing apparatus, some errors always exist in the average running velocity of the magnetic tape, because of errors in the diameter of the capstan shaft and a variation of back-tension in the magnetic tape due to a slippage between the magnetic tape and the capstan. Furthermore, even when magnetic tape is recorded in a constant condition, a contraction or stretching of the magnetic tape might occur because of variations in the tension of the tape at the time of winding on the reel and in the storage temperature thereof or because of variations in the taoe tension in the recording and reproducing apparatus (hereinafter called a VTR apparatus) when the VTR apparatus is operated in a reproducing mode. This causes a positional deflection in the reproduced track, which is equivalent to deflections introduced by the recording operating under an irregular running speed of the tape. To eliminate the above described disadvantages, a servo system has been employed for the capstan in the ordinary VTR apparatus so that an automatic tracking adjustment is achieved during the tape supplying period.

At the time of recording a common practice in such a capstan servo system compares the phase of a signal obtained from a detector for the rotation of the capstan with the phase of a reference signal. The servo system is operated to match the phases of the rotation signal with the reference signal, and simultaneously the reference signal is recorded on the magnetic tape along its control track, as a newly recorded control signal. At the time of reproducing, the newly recorded control signal is reproduced. The phase of the reproduced control signal is compared with the phase of the reference signal, and the servo system is operated so that the phases of both signals are aligned with each other. Because of the above described procedure in the conventional VTR apparatuses and, although the phase of the rotation of the capstan is kept in a correct matching condition with that of the reference signal during its recording operation, both of the phases can not always be kept in matching during its reproducing operation. The difference between these phases varies with time corresponding to the variation in the slip between the capstan and the magnetic tape.

In the capstan servo system as described above, for automatically adjusting the tracking, a required automatic tracking adjustment could be carried out, even if the rotational phase of the capstan be kept free from that of the reference signal during the reproducing operation. However, an electronic editing in an assembly mode is carried out in a VTR apparatus having a capstan servo system as described above. Without providing any matching procedure between the phases of the rotation of the capstan and the reference signal, the cpastan must be accelerated or decelerated in a transient time for the transfer of the operation from the reproducing mode to the recording mode before a correct matching is obtained between the two phases. As a result, when thus edited magnetic tape is reproduced. The tracking might be lost at the junction of the previous record and the newly exercised electronic editing. There has been a tendency for the reproduced image to be impaired with a flowing phenomenon in the picture.

Accordingly, in a VTR apparatus which might be subjected to an electronic editing of an assembly mode the, following phase matching procedures have been considered. (1) A system includes means for detecting the phase difference between the reference signal and the signal representing the rotation of the capstan in the reproduction mode of operation of the VTR apparatus. The phases of the rotation of the capstan and the reference signal are matched beforehand by varying the phase of the reference signal employing a resolver. The resolver is fixed at the time when the operation is transferred from the reproduction mode to the electronic editing mode. Thus, the two phases of the rotation of the capstan and the reference signal will be matched with each other from the time point when the operational mode is transferred as described. (2) The loop-gain in a phase matching circuit is lowered in the servo system for controlling the capstan at the time when the operation of the VTR apparatus is transferred from the reproduction mode to the electronic editing mode. Thus, the matching of the phases is carried out comparatively slowly.

However, according to the first system (1) of the conventional system for matching the two phases, for instance, a resolver and a DC motor for stopping it are required at the time of the operational transfer. Thus, the construction of the VTR apparatus is complicated, and the increase in the components of the apparatus increase the cost and impair the reliability. The system (2) requires a lower loop-gain of the phase matching circuit in the VTR apparatus when the apparatus is transferred, in its operation, from the reproduction mode to the electronic editing mode. Thus, the transition period (drawing period) for matching the two phases is made lower. Other disadvantages, such as skew distortions of the image or easily introducing outside noises have also accompanied with this procedure.

SUMMARY OF THE INVENTION

Therefore, a fundamental object of the present invention is to provide a novel capstan phase matching system which may be employed at the time when the operation of the VTR apparatus is transferred from a reproduction mode to an electronic editing mode. Another object is to substantially eliminate all of the above described disadvantages of the conventional practices.

Another object of the invention is to provide a novel capstan phase matching system to be employed at the time when the operation of the VTR apparatus is transferred from the reproduction mode to an electronic editing mode. Here an object is to match the phase of the rotation of the capstan and the phase of a reference signal within an extremely short period and in an extremely smooth manner. According to the system of the present invention, the required number of parts is substantially minimized and the production cost thereof is substantially enonomized.

A further object and a characteristic feature of the present invention is to provide a novel capstan phase matching system to be used at the time when the operation of the VTR apparatus is transferred from the reproduction mode to an electronic editing mode. In keeping with an aspect of this invention, a capstan servo system is provided for controlling the rotation of the capstan. A comparator circuit included therein compares the phases of a reference signal and a signal representing the rotation of the capstan, thereby producing a control signal for controlling the rotation of the capstan. The signal representing the rotation of the capstan has a frequency sufficiently higher than that of the reference signal. A frequency demultiplying means demultiplies by $1/n$ frequency of the detected rotation signal of the capstan to a value identical to that of the reference signal. Means are provided for initiating the frequency demultiplying operation of the circuit at the appearance of the first reference signal after the operational mode of the VTR apparatus is transferred from the reproduction mode to the electronic editing mode.

According to the capstan phase matching system of the invention, the required period for matching the phases can be substantially reduced by $1/n$ if the amount of the magnetic tape shifted in the period of the transfer of mode is assumed to be a constant. The amount of the magnetic tape moved in the period of the transfer can be substantially minimized by $1/n$ if the required period for the matching of the phases is assumed to be a constant. Further, the transfer of the modes is not accompanied by abrupt acceleration and deceleration of the capstan.

Other objects and characteristic features of the present invention will be made fully apparent from the detailed description of the invention hereinafter when read in conjunction with the accompanying drawings, in which.

Figure 4:
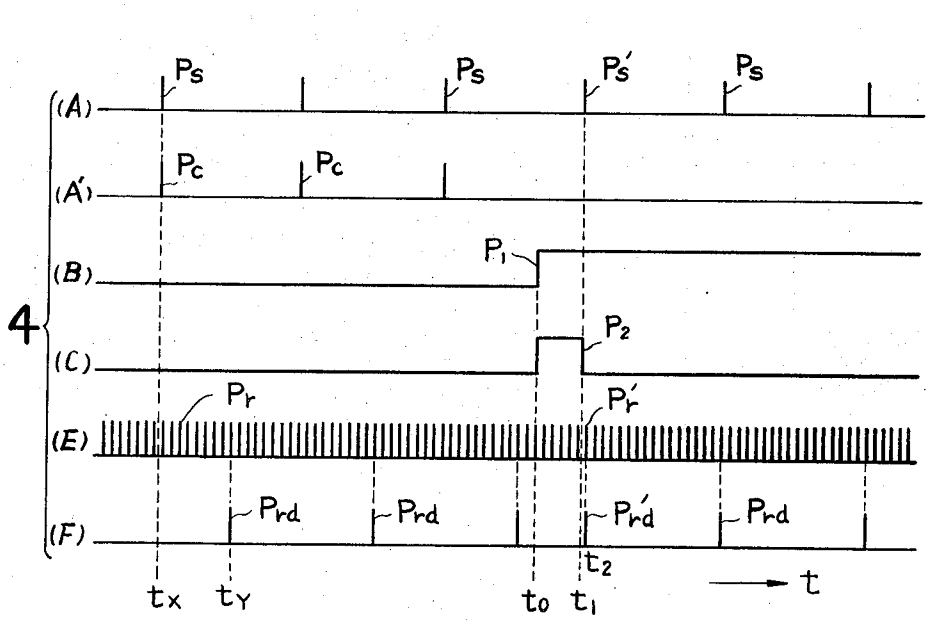
Figure 5:
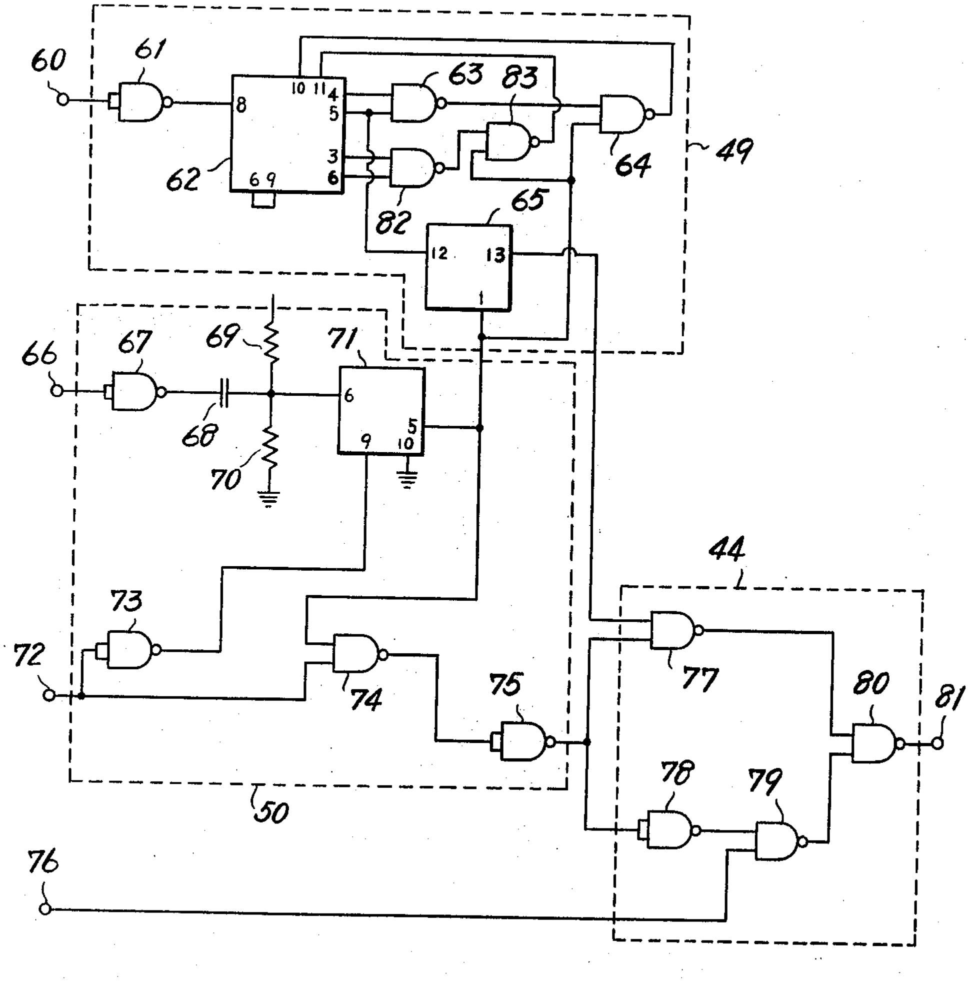

FIGS. 4(A) to 4(F) are waveform diagrams employed for an explanation of the operation of the capstan phase matching system according to the present invention; and FIG. 5 is a circuit diagram showing an embodiment of a circuit of an essential part of the capstan phase matching system according to the present invention.

DETAILED DESCRIPTION OF THE INVENTION

Figure 1:
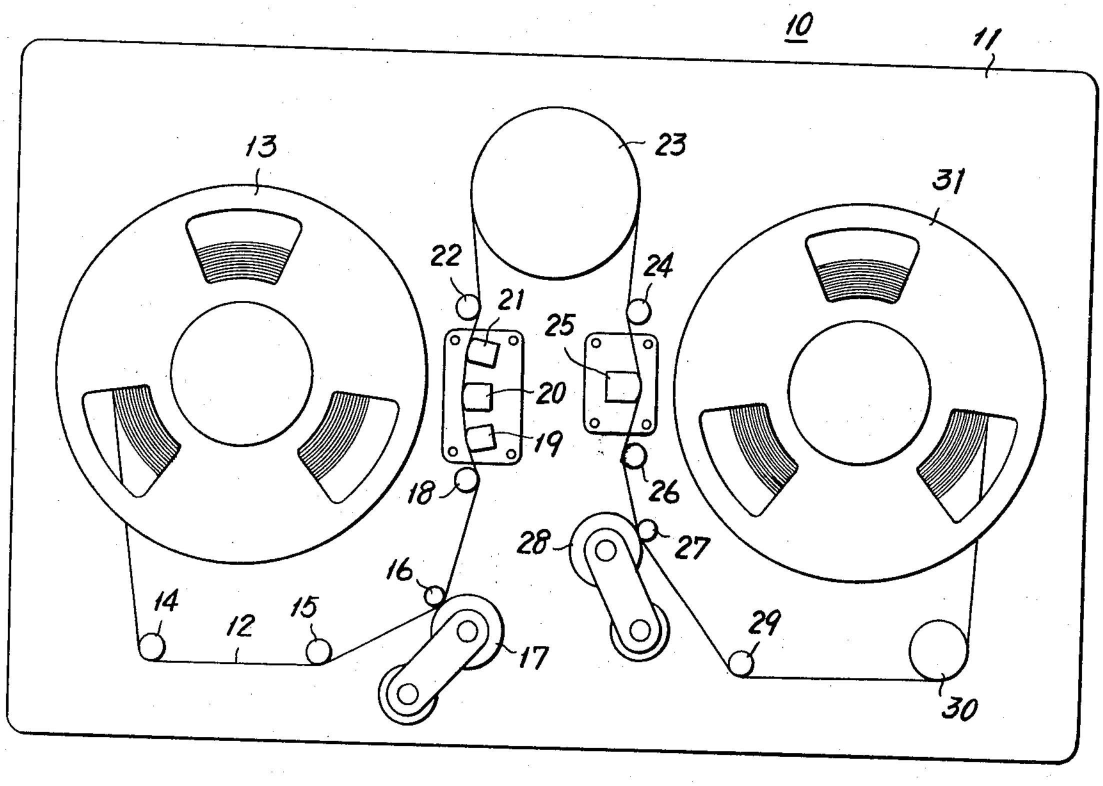
FIG. 1 is a plan view showing the outline of an embodiment of the VTR apparatus wherein the present invention is to be employed.

First, one embodiment of a VTR apparatus, to which the system according to the invention is applicable, will be described with reference to FIG. 1. FIG. 1 is a plan view of a part of a VTR apparatus 10 which appears above a top panel 11. The apparatus will be described in the order of the running of a magnetic tape along its path. A magnetic tape 12 is supplied from a supply reel 13 and guided by guide poles 14 and 15. It is held between and driven by a speed control capstan 16 and a pinch roller 17. After being guided by a guide pole 18, the magnetic tape 12 is brought into contact with an erasing magnetic head 19, an audio magnetic head 20 and a control signal recording and reproducing magnetic head 21, in sequence. During recording, an information signal recorded on the magnetic tape 12 is erased by the erasing magnetic head 19 for the whole width of the tape. Audio signals are recorded on one edge portion of the tape by the audio magnetic head 20, and control signals are recorded on the other edge portion of the tape by the control signal recording and reproducing magnetic head 21. During reproducing, the control signals which are recorded on the magnetic tape 12 are reproduced by the magnetic head 21.

The magnetic tape 12 is guided by a guide pole 22, and advances toward a guide drum 23 at a predetermined direction. The guide drum 23 has upper and lower guide drum halves spaced apart from each other with a gap of a predetermined distance formed therebetween. Two rotary video magnetic heads (not shown) rotate in the gap between the two guide drum halves. The magnetic tape 12 is guided by guide poles 22 and 24 so that the range of winding of the magnetic tape 12 around the guide drum 23 is limited to approximately 190° of the circumference. The longitudinal direction of the tape is helical relative to the gap of the guide drum 23. Accordingly, video signals are recorded on or reproduced from the tape by the video magnetic heads in the guide drum 23. A plurality of parallel tracks are formed obliquely relative to the longitudinal direction of the magnetic tape 12.

The magnetic tape 12, guided by the guide pole 24, is brought into contact with the control signal reproducing magnetic head 25 which reproduces the control signal recorded by the control signal recording and reproducing magnetic head 21. Then, the magnetic tape 12 is guided by a guide pole 26 and is driven by a capstan 27 and a pinch roller 28, for controlling the tension of the tape. The magnetic tape 12 is further guided by a guide pole 29 and a tape counter roller 30 to a take-up reel 31.

Figure 2:
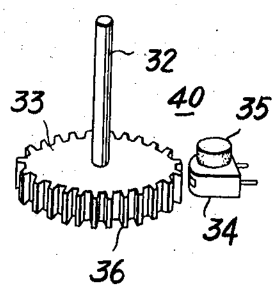
FIG. 2 is a perspective view of an embodiment of capstan rotation detector.
Figure 3:
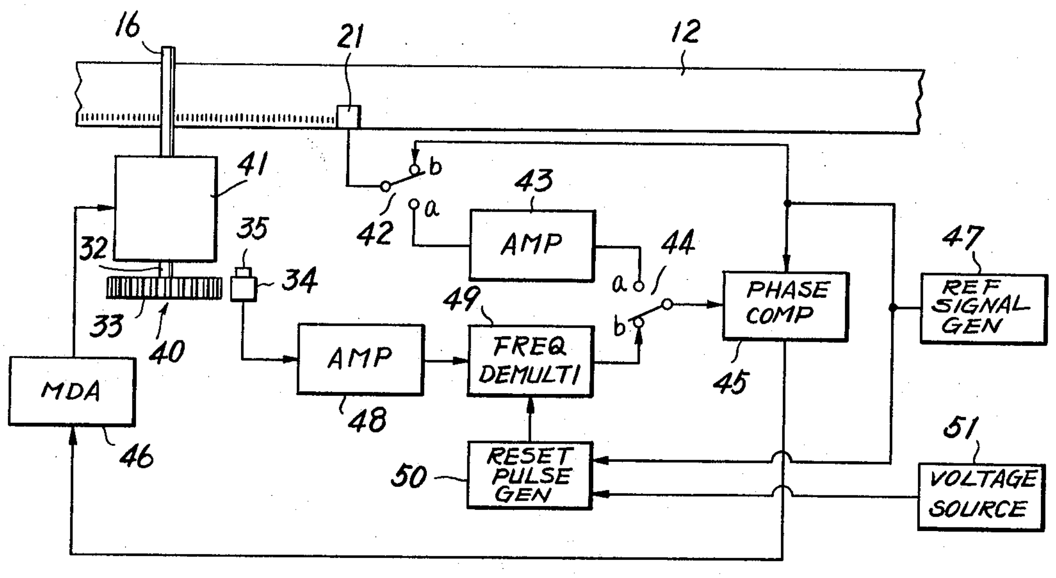
FIG. 3 is a block diagram of a phase matching system constituting an embodiment of the present invention.

FIG. 2 is a perspective view of one embodiment of a capstan rotation detector 40 used in the block diagram of one embodiment of the system according to the invention shown in FIG. 3. A flywheel 33 is fixedly mounted on the lower end of the shaft 32 which rotates integrally with the capstan 16. The flywheel 33 has 120 teeth 36 on the outer periphery thereof. A magnetic head 34 for detecting the rotation of the capstan 16 is provided adjacent to the flywheel 33. A permanent magnet 35 is fixedly mounted on the top surface of the magnetic head 34. As the flywheel 33 is rotated and one of the projecting portions of the teeth 36 has reached a position where it is opposed to the gap of the magnetic head 34, a closed magnetic circuit passes through the head core of the magnetic head 34 and the projecting portion of the teeth 36. Thereby the flux from the magnet 35 increases. When one of the recesses of the teeth 36 has reached a position where it is opposed to the gap of the magnetic head 34, the magnetic circuit is opened, and the flux from the magnet 35 decreases. Thus, the flux passing through the head core of the magnetic head 34 alternately increases and decreases responsive to the rotation of the flywheel 33 whereby electrical signals are obtained from a coil wound on the head core of the magnetic head 34. Accordingly, each time one of the projecting portions of the teeth 36 passes before the magnetic head 34 by the rotation of the flywheel 33, a signal is obtained in a cyclically recurring sequence of signals. In the present embodiment, the capstan shaft 32 is rotated at a rotational speed of 7.5 revolutions per second, so that the rotation signal of $120 \times 7.5 = 900$ (Hz) is detected.

Referring now to FIG. 3, the capstan 16 and the shaft 32 of the rotation detector 40 are rotated by a capstan driving motor 41. In the reproduction mode of operation of the VTR apparatus, a control signal of 30 Hz is obtained from the control signal reproducing head 21 scanning the control track of the magnetic tape 12 which is moved by the capstan 16 and the pinch roller 17. It should be noted that during the reproducing mode of operation, the mode-transferring relays 42 and 44 are switched to the contact *a*, and the control signal reproduced by the head 21 is supplied through the relay 42 to an amplifier 43. The control signal thus amplified in the amplifier 43 is thereafter sent to a phase comparator 45 through the relay 44. The comparator circuit 45 is also supplied with a reference signal of 30 Hz from a reference signal generator (a reference signal source) 47. The phase of the reproduced control signal is therein compared with that of the reference signal supplied from the reference signal source 47. An error signal obtained from the comparator circuit 45, as a result of the comparison of the two phases, is thereafter supplied to motor driving amplifier 46. The output of the amplifier 46 is employed for controlling the rotation of the capstan motor 41. Thus, in the reproduction mode of the operation of the VTR apparatus, the rotation of the capstan 16 is controlled in such a manner that the phases of the reproduced control signal and the reference signal from the reference signal source 47 are matched and made to coincide with each other.

When the operation of the VTR apparatus is transferred from the above described reproduction mode to the electronic editing mode, the positions of the relays 42 and 44 are transferred to the contact *b*. The reference signal of 30 Hz, from the reference signal source 47, is supplied to both the phase comparator 45 and the control magnetic head 21. The reference signal thus supplied to the control head 21 is newly recorded in the control track of the magnetic tape 12 as a control signal. It will be noted that the electronic editing recording mode of operation in the present embodiment is an assembly recording mode in which one program signal is recorded after one point on the magnetic tape 12 on which another program signal has been recorded.

In the assembly recording mode, the recorded signal on the magnetic tape 12 is fully erased throughout the width thereof. The control signal is recorded in a track along the longitudinal direction of the magnetic tape 12 by the control head 21. The video signal is recorded in a plurality of parallel tracks oblique to the longitudinal direction of the magnetic tape 12. Recording is by the rotary magnetic video heads contained in the guide drum 23.

During the above described operation, a signal of about 900 Hz is obtained from the detector 40 for detecting the capstan rotation, and is amplified in an amplifier 48. The thus amplified signal is then supplied to a frequency demultiplier 49. The frequency of 900 Hz of the thus amplified signal is demultiplied by a ratio of 1/30 so that an output signal having a frequency of 30 Hz can be obtained from the frequency demultiplying circuit 49. The output signal having a frequency of 30 Hz is thereafter supplied to the phase comparator 45 through the relay 44. The error signal obtained from the phase comparator circuit 45 is supplied through the amplifier 46 to the capstan motor 41. Thus, in the electronic editing recording mode of operation, the phase of the rotation of the capstan 16 is adjusted in such a manner that the phases of the rotation detecting signal and the reference signal are matched with each other.

In the above described case, if the frequency of the reference signal is represented by fs (in this particular embodiment, $fs$ is equal to 30 Hz), the frequency of the output detected signal of the rotation detector 40 is sufficiently higher than the frequency fs, and expressed as $nfs$ (wherein $n$ is an integer larger than 1 — in this embodiment, $n$ is 30). In this this embodiment the output signal is equal to 900 Hz. The frequency demultiplying circuit 49 receives the detected signal from the rotation detector 40 and demultiplies the frequency by a ratio of $1/n$ so that the frequency equal to the frequency fs of the reference signal can be thereby obtained.

According to the present invention, the matching of the phases of the rotation signal obtained from the rotation detector 40 and the reference signal is carried out in an extremely short period when the operation of the VTR apparatus is transferred from the reproduction mode to the electronic editing mode. In other words, the phase of the reference signal and the phase of the rotation of the capstan are matched with each other in an extremely short period without causing any abrupt acceleration or deceleration of the capstan 16.

The operation of the phase matching system according to the present invention will be described with reference to FIGS.4(A) to 4(F).

The frequency demultiplier 49 interrupts or restores its operation upon the reception of the output pulse signals from a reset pulse generator 50. The reset pulse generator 50, in this embodiment, includes of a flip-flop circuit. FIG.4(A) shows a series of reference pulse signals Ps having a repetition frequency of fs (equal to 30 Hz) and supplied from the reference signal source 47 to the reset pulse generator 50. FIG. 4(B) shows a voltage signal $P_1$ supplied from an electronic editing recording voltage source 51 which rises at an instant when the operation of the VTR apparatus is transferred from the reproduction mode to the electronic editing mode. The higher voltage is maintained throughout the period during which the electronic editing mode of the operation continues. The voltage signal $P_1$ is thus applied to the reset pulse generator 50 for generating a reset pulse at the instant when the operation of the VTR apparatus is transferred from the reproduction mode to the electronic editing mode. The transferring action of the operation of the VTR apparatus may be carried out either manually or electrically responsive to a detection of, for instance, a que signal recorded in the magnetic tape 12. The reset pulse generator 50 is set at the time point $t_o$ when the operation of the VTR apparatus is transferred. Generator 50 is reset at the time point $t_1$ at which time the first pulse after the time point $t_o$ of the reference pulse signal Ps shown in FIG.4(A) arrives at the reset pulse generator 50 to generate a reset pulse P2 as indicated in FIG.4(C). This pulse signal P2 is thereafter supplied to the frequency multiplier 49 for controlling the operation of the circuit 49.

The series of the reference pulse signals Ps are generated from the reference signal source 47 with a constant time interval regardless of whether the operation of the VTR apparatus is the reproduction mode or in the electronic editing mode. In the embodiment shown in the figure, the reproduction mode is before the time point $t_o$ namely left-hand side relative to the time point $t_o$ on the time axis. The editing mode is after the time point $t_o$, namely the right-hand side relative to the time point $t_o$. When the VTR apparatus is operated in the reproduction mode, respective pulses in the series of the control pulse signals Pc, as shown in FIG. 4(A'), which is reproduced by the control head 21, are brought into the same positions as those of the series of the reference pulse signal Ps under the control of the capstan servo system. Also while the VTR apparatus is operated in the reproduction mode, the rotation signal obtained from the capstan rotation detector 40, having a frequency equal to *nfs*, is in the form of a pulse train P*r* as shown in FIG. 4(E). This rotation signal P*r* is passed to the frequency demultiplier 49. The frequency of the signal P*r* is demultiplied at a ratio of 1/*n* and a pulse train P*rd*, as shown in FIG. 4(F), is thereby obtained.

As will be apparent from a comparison of the waveforms shown in FIGS. 4(A) and 4(F), the individual pulses constituting the pulse signal P*rd* are located at different time points with respect to those of the reference pulse signal P*s*. The embodiment of FIGS. 4(A) to 4(F) shows that a time difference $(t_y - t_x)$ exists between the appearance positions of the respective pulses of the reference pulse signal Ps and the appearance positions of the respective pulses of the rotation representing pulse signal P*rd* at the time when the VTR apparatus is operated in the reproduction mode. The position $t_x$ represents a time point of one of the reference pulse signals P*s*, and $t_y$ represents a time point of the first pulse signal P*rd* next to the above described pulse signal P*s*.

Now it is assumed that the operation of the VTR apparatus is transferred from the reproduction mode to the electronic editing mode under a condition where the time difference $(t_y - t_x)$ exists between the time point of the reference pulse signal P*s* and the time point of the rotation pulse signal P*rd*. If the phases of these two signals are intended to be aligned with each other by means of any conventional means of a simple constitution, the rotation of the capstan 16 wound be accelerated or decelerated in a large amount.

Such a disadvantage of the conventional procedures can be substantially eliminated in accordance with the present invention. The phase of the rotation of the capstan can be matched with that of the reference signal in a short period and in a smooth manner. As described above, the repetitive frequency of the capstan rotation signal pulse P*r* obtained from the rotation detector 40 is equal to nfs, and *n* or $(n - 1)$ pulses of the rotation signal pulses Pr exist in the interval between two adjacent individual pulses of the reference pulse signal P*s*.

The frequency multiplying circuit 49 is so arranged that the operation thereof is stopped at the time point $t_o$ when the operation of the VTR apparatus is transferred from the reproduction mode to the electronic editing mode. Circuit 49 operation is resumed in its operable state by the detected rotation signal pulse P*r'* generated at the time position *t*2 nearest after the time point $t_1$ at which the initial reference signal pulse P*s'* is generated after the time point $t_o$. A frequency multiplied rotation signal pulse Prd is generated from the frequency multiplying circuit 49. In this case, the time interval between the reference signal pulse P*s'* occurring at the time point t1 and the first rotation signal pulse P*rd'* of the output rotation pulse signal P*rd'* of the circuit 49 is apparently less than 1/nfs second. It will be apparent that this time interval is made smaller when the value of *n* becomes larger.

Herein, it should be noted that the above described reset pulse generator 50 is set to its operative state at the time point $t_o$ responsive to the voltage signal P1 sent from the voltage source 51, and is reset to its inoperative state through the reference signal P*s* at the instant of the first pulse P*s'* after the time point $t_o$. The VTR apparatus is transferred with respect to its operation from the reproduction mode to the electronic editing mode. As a result, the reset pulse generator 50 generates a reset pulse P2 as shown in FIG. 4(C) which is thereafter supplied to the frequency demultiplier 49. The frequency demultiplier 49 is constructed, in this embodiment, into a pulse counter type which stops its counting operation upon the reception of the reset pulse P2.

The frequency demultiplier 49 generates frequency demultiplied rotation signals P*rd* having a repetitive frequency *fs* (30 Hz in this embodiment) when the operation of the VTR apparatus is in the reproduction mode. There is a time difference $(t_y - t_x)$ between the recurring positions of the reference signal pulses P*s* and those of the frequency demultiplied rotation signal pulses P*rd*. This frequency demultiplier 49 instantaneously stops its frequency demultiplying operation (counting down operation) responsive to the reception of the rising edge of the reset pulse P2 from the reset pulse generator 50, at the time point where the operation of the VTR apparatus is transferred from the reproduction mode to the electronic editing mode. The frequency demultiplier 49 again resumes its operable state responsive to the reception of the falling edge of the reset pulse P2 at the time point *t*1. Thus, the frequency demultiplier 49 starts to generate frequency demultiplied rotation signal pulses P*rd'* having a repetitive frequency of *fs* (30 Hz). This signal is demultiplied by 1/*n* (1/30) from the frequency nfs (900 Hz) of the rotation signal pulse *Pr'*, obtained from the rotation detector 40 at the time point *t*2. The rotation signal pulse P*r'* is generated after the reference signal pulse P*s'* which occurs at the time point P1 of the frequency *fs* (30 Hz) There is a coordination of the pulses first generated after the time point $t_o$, where the operation of the VTR apparatus has been transferred into the electronic editing recording mode. Here aging, the time difference (*t*2 – *t*1) between the reference signal pulse P*s'* and the frequency demultiplied rotation signal pulse P*rd'* is less than 1/*nfs* second as described above.

In the conventional system, a large time difference $(t_y - t_x)$ should be corrected in order to match the phase of rotation of the capstan with the phase of the reference signal. Therefore, the capstan should be quickly accelerated or decelerated and it requires very much time to match the phases.

On the contrary, according to the present invention, there is only a slight phase difference corresponding to this extremely short time difference (*t*2 – *t*1) which is less than 1/*nfs* second, to be corrected. Hence, the control of the rotation of the capstan can quickly achieve the phase matching in an extremely short period and in an extremely smooth procedure.

Therefore, an advantage is seen when the required time intervals are compared between the procedure according to the present invention and the conventional procedure. The frequency of the rotation signal pulse Pr obtained from the rotation detector 40 is selected to be equal to the frequency *fs* of the reference signal pulses Ps. The phase matching of the two signals Pr and Ps is attempted at the time of the operation transfer of the VTR apparatus. The lengths of the magnetic tape moved during this time interval is assumed to be constant in these two cases. It is thus made apparent that the time interval required in the present invention is shorter by $1/n$ (1/30 in this embodiment) than the time interval required in the conventional procedure. When the lengths of the magnetic tape moved during these time intervals are compared, with the required time intervals being assumed to be a constant, the length required in the present invention is shorter by $1/n$ (1/30 in this embodiment) than that in the conventional procedure.

FIG. 5, shows an embodiment of an electric circuit, in a practicable form, of the frequency demultiplier 49, the reset pulse generator 50, and the operation mode change over relay 44. In the frequency demultiplier 49 position of the circuit, the rotation signal obtained from the rotation detector 40 for the capstan 16 is introduced at a terminal 60, inverted in polarity by an inverter 61, and supplied to a four-bits binary counter 62. The four-bits binary counter 62, in cooperation with two-input NAND gates 63, 64, 82 and 83 constitues a frequency demultiplier of 1/15 ratio.

The frequency of the rotation signal is demultiplied by 1/15 and then supplied to a J-K master-slave flip-flop 65 in which the frequency is further demultiplied by ½. Accordingly, an output signal is ultimately demultiplied by 1/30 and supplied from the frequency demultiplier 49 to one terminal of a two input NAND gate 77 in the operation change over relay 44. The frequency demultiplier 49 can be reset by responsive to the output signal from a J-K master slave flip-flop 71 in the reset pulse generator 50. The signal from flip-flop 71 is applied to the flip-flop 65 and the NAND gate 64 in the frequency demultiplier 49.

In the reset pulse generator 50, the reference signal is supplied from the reference signal source 47 through a terminal 66 and its polarity inverter 67. The reference signal thus inverted in polarity is thereafter formed into a pulse signal having a narrow width. This formation occurs in a differentiating circuit comprising a capacitor 68 (0.001 F) and resistors 69, 70 (both 3.9 KΩ). These signals are supplied to the J-K mastr-slave flip-flop 71 as its resetting pulse. On the other hand, en electronic editing mode voltage P1 of positive polarity is supplied from the voltage source 51 through a terminal 72 and inverter 73 to the flip-flop 71, as its toggle input signal. The flip-flop 71 is normally placed in a state delivering +6V as its output responsive to the action of the reset signal formed from the reference signal. When the toggle input signal is applied, the output flip-flop 71 is switched to ground or OV. The condition of the flip-flop 71 is further transferred when another input reference pulse arrives. Then the output is switched to be +6V. The output signal from the flip-flop 71 is then supplied to the frequency demultiplier 49 as a reset pulse for stopping the frequency demultiplying operation as described above. Furthermore, the output of the flip-flop 71 is also supplied to one input of the two-input NAND gate 74. Since the voltage from the terminal 72 has been applied to another input of the NAND gate 74, A NAND operation is carried out therein for both of the inputs. As a result, a recording mode voltage is formed in such a manner that the voltage starts to set up from the time point when the reset pulse rises (this corresponds to the falling position in FIG. 4(C)). In other words, the start is from the time point when the first pulse Ps occurs after the reception of the electronic editing mode voltage P1. This recording mode voltage is inverted by an inverter 75 so that the value thereof is +6V at the time of recording, and is supplied to the subsequent operation mode change-over relay circuit 44.

In the operation mode change over relay 44, the output signal from the inverter 75 in the reset pulse generating circuit 50 is partly supplied to another input of the NAND gate 77 and partly supplied to an inverter 78. The output of the inverter 78 is then supplied to one input of a two input NAND gate 78. It should be noted that one input of the NAND gate 77 is supplied with the rotation signal of a frequency demultiplied in the frequency demultiplier 49 as a pulse of +6V. To another input terminal of the NAND gate 79, the control signal reproduced by means of the control head 21 at the time of the reproduction mode as the control pulse of +6V is supplied through a terminal 76.

The outputs from the NAND gates 77 and 79 are then supplied respectively to two inputs of another NAND gate 80. At the output of the NAND gate 80, the reproduced control pulse signal is supplied through the terminal 76 at the time of the reproduction mode of operation of the VTR apparatus. The rotation signal having a frequency demultiplied in the frequency demultiplier 49 is obtained at the time of the electronic editing recording mode of operation. The output signal from the NAND gate 80 is delivered through an output terminal 81 and supplied to the phase comparator 45.

In the above description, although the operation of the frequency demultiplier 49 has been described as being stopped by the rising edge of the reset pulse P2 and resumed to its operable state at the falling edge of the same pulse P2, this portion of the circuit may be so arranged that the frequency demultiplier 49 is stopped in its operation from the initial instant of the reproduction mode of operation, and is returned to the operable state at the time point when the pulse signal P2 falls down.

Furthermore, the above described frequency demultiplying ratio is $1/n$, whereby the frequency of the rotation signal obtained from the rotation detector 40 (and having a value of nfs) is demultiplied to *fs* of the frequency of the reference signal. However, the invention is not necessarily limited to 1/30 but, any other integer dividing ratio preferably larger than 1/10, may also be employed without much affecting construction of the present invention.

Further, this invention is not limited to these embodiments but various variations and modifications may be made without departing from the scope and spirit of the invention.

What I claim is:

1. An editing control system for a TV tape recorder comprising means for generating a series of cyclically recurring pulses having a first pulse repetition rate which varies directly as a function of the rotational speed of a capstan in said recorder, means for recording a second series of cyclically recurring reference pulses having a second pulse repetition rate which is a fraction of said first pulse repetition rate on said tape to enable synchronism of said capstan speed with said tape speed, pulse rate converting means for normally causing said two series of pulses to have the same second repetition rate, means responsive to switching between record and reproducing modes of operation for stopping said converting means to cause said two series of pulses to have the first and second pulse repetition rate, respectively, means responsive to the next occurring reference pulse for restarting said converting means, means for comparing the phases of said two series of pulses, and means responsive to said phase comparing means for bringing said capstan and tape speeds into synchronism.

2. A phase matching system for a magnetic recording and reproducing apparatus operating in an electronic editing mode, comprising: means including a reference signal source for generating a reference signal of a predetermined frequency; means for recording a control signal of a predetermined frequency on a magnetic tape; means including a magnetic head for recording and reproducing a control signal on the magnetic tape; capstan means for driving said magnetic tape along a path of travel; means for detecting the rotation of said capstan and for producing a rotation signal responsive to the rotation thereof, said detecting means being so arranged that said rotation representing signal has a frequency of *n*-times (wherein *n* is a positive integer) said predetermined frequency of said reference signal; means for demultiplying the frequency of said rotation signal obtained from said detecting means by a ratio of $1/n$; means responsive to operation in the reproducing mode of said apparatus for comparing the phase of a control signal reproduced by said reproducing means with the phase of said reference signal obtained from said reference signal source, means responsive to operation in an electronic editing recording mode of operation for comparing the demultiplied phase of said rotation signal with the phase of said reference signal from said reference signal source, means for controlling the rotation of said capstan in response to an error signal obtained from said phase comparing means so that the phase of the rotation of said capstan matches with the phase of said reference signal; and means for supplying to said frequency demultiplying means a frequency demultiplying operation control signal for bringing said frequency demultiplying means into operable condition at the time point of the occurrence of the first reference signal which appears after the operational mode of the apparatus is transferred from the reproduction mode to the electronic editing recording mode; said frequency demultiplying means starting its frequency demultiplying operation responsive to the control signal appearing at the first rotation signal after the existence of the first reference signal which appears after the operational mode of the apparatus is transferred.

3. The phase matching system as defined in claim 2 and means wherein said frequency demultiplying operation control signal is a signal by which the operation of the frequency demultiplying means is stopped at the time point when the operation of the apparatus is transferred from the reproduction mode to the electronic editing recording mode, and means for resuming the operation of the frequency demultiplying means responsive to the time point of the first reference signal after the operational mode of the apparatus is transferred as described above.

4. The phase matching system as defined in claim 2 wherein said means for detecting the rotation of the capstan includes means for producing a rotation signal of a sufficiently large frequency which is more than 10 times as large as said predetermined frequency of said reference signal.

5. The phase matching system as defined in claim 2 which further comprises means including said control signal recording and reproducing magnetic head for recording a reference signal from said reference signal source on said magnetic tape while the apparatus is operating in the electronic editing recording mode.

6. A system for matching phases for a magnetic recording and reproducing apparatus operating in an electronic editing mode comprising: a reference signal source means for generating a reference signal of a predetermined frequency; means for recording on a magnetic tape a control signal of the same frequency as said predetermined frequency; means including a magnetic head for recording and reproducing a control signal on the magnetic tape while the apparatus is operating in the reproduction mode and for recording said control signal on said magnetic tape while the apparatus is operating in the electronic editing recording mode; means comprising a capstan for driving said magnetic tape along its path; means for detecting the rotation of said capstan and producing a rotation signal of a frequency *n*-times (a large positive integer) said predetermined frequency responsive to the rotation of said capstan; means for demultiplying the frequency of said rotation signal obtained from said detecting means by a ratio of $1/n$; means effective during the reproducing mode of operation of said apparatus for comparing the phase of a control signal reproduced by said reproducing means with the phase of said reference signal obtained from said reference signal source, means effective during the time of an electronic editing recording mode of operation for comparing the phase of said rotation signal with the frequency which is demultiplied by said demultiplying means with the phase of said reference signal from said reference signal source; means for controlling the rotation of said capstan in response to an error signal obtained from said phase comparing means so that the phase of the rotation of said capstan matches the phase of said reference signal; a voltage source means for supplying a voltage at the time of the electronic editing recording mode of operation; and means responsive to said reference signal and an electronic editing recording mode voltage when the operation of the apparatus is transferred from the reproduction mode to the electronic editing recording mode for producing a control signal which rises in response to the rising edge of said electronic editing recording mode voltage and falls responsive to the occurrence of the first reference pulse supplied after said rising of said control signal; said control signal being supplied to said means for demultiplying the frequency, whereby said means for demultiplying the frequency is stopped in its operation only for the pulse-width period of said control signal and resumes its operation responsive to the first rotation pulse occurring after the existence of the first reference pulse after said mode transferring time.

7. A capstan phase matching system in an electronic editing mode for magnetic recording and reproducing apparatus comprising:

a. a reference signal source for generating a series of reference pulse signals of a predetermined frequency;

b. a magnetic tape;

c. driving means responsive to a control signal for rotating a capstan to move said magnetic tape along a predetermined path;

d. means responsive to the rotation of said capstan for producing a first rotation signal having a frequency n-times greater than the frequency of said reference pulse signal, n being a positive integer substantially larger than 10;

e. demultiplier means responsive to said first rotation signal for producing a second rotation signal having a frequency demultiplied by a ratio of $1/n$ from the frequency of the first rotation signal;

f. switching means for switching between a reproducing mode and a recording mode of the magnetic recording and reproducing apparatus;

g. means including a magnetic head and operated responsive to the switching action of said switching means for recording said reference pulse signals on said magnetic tape in the recording mode and for reproducing the reference pulse signal from the magnetic tape in the reproducing mode;

h. means responsive to the switching action of said switching means from the reproducing mode to the recording mode for stopping the operation of said demultiplier means and for resuming the operation of said demultiplier means in response to a pulse of said reference pulse signal which first appears after the switching action of said switching means; and i. means responsive to the switching action of said switching means and operable in the reproducing mode to supply to said driving means said control signal in response to the phase difference between said reference pulse signal and the reproduced reference pulse signal, and in the recording mode to supply said control signal in response to the phase difference between said reference pulse signal and said second rotation signal.

8. The system as defined in claim 7 wherein said means responsive to the switching action of said switching means for stopping and resuming the operation of said demultiplier means comprises means responsive to the switching action of said switching means for generating a D.C. signal of a predetermined voltage only during the recording mode, means for producing a pulse signal with a rising edge responsive to the front edge of said D.C. signal and a falling edge responsive to the pulse of said reference pulse signal which first appears after the generation of said D.C. signal, and means for stopping the demultiplying action of said demultiplier means during the pulse duration of said pulse signal.

* * * * *